UNITED STATES PATENT OFFICE.

NELSON GOODYEAR, OF NEWTOWN, CONNECTICUT.

IMPROVEMENT IN THE MANUFACTURE OF INDIA-RUBBER FABRICS.

Specification forming part of Letters Patent No. 4,047, dated May 13, 1845.

*To all whom it may concern:*

Be it known that I, NELSON GOODYEAR, of Newtown, in the county of Fairfield and State of Connecticut, have invented a new, useful, and Improved Method of Manufacturing India-Rubber Cloth and Sheet India-Rubber and all other India-Rubber Fabrics, of which the following is a specification.

The design and purport of my invention is to impart additional strength, solidity, tenacity, and durability to all india-rubber fabrics by combining in any manner the shearings, clippings, or nappings of wool, cotton, silk, hair, fur, or any fibrous substances with india-rubber or any compound of it.

To enable others skilled in the art of manufacturing india-rubber cloth to use my invention, I describe a process by which the same may be effected, viz:

A plain piece of common cloth for a base having been passed through the colander and charged with the gum in the usual manner. I then, while the gum is soft and adhesive, add a coat of the fibrous substances above mentioned, and combine them firmly with the gum by passing them through the colander, and then by adding another coating of gum and another of the fibrous substances, and repeating the process alternately with the gum and flock, strongly impressed in alternate strata, until the thickness and firmness required is obtained, the last coat being usually gum. Cloth thus manufactured and left with a smooth surface will have the solidity and firmness of leather, and may be and now is extensively used as a cheap substitute for it, and as it will retain the peculiar qualities of india-rubber cloth, for many purposes is much better than leather.

The object of this invention is a firm texture by combining and mingling fibrous substances with india-rubber in the manufacture of cloth. It may be done and effected in the manner above stated, and in any other method adapted to the complete amalgamation and firm adhesion of those substances.

Cloth thus made I call "india-rubber leather."

I claim as my invention—

The intermingling and combining fibrous substances with the gum in forming india-rubber fabrics, solid and firm in the body with a smooth surface resembling leather.

NELSON GOODYEAR.

Witnesses:
SIMEON BALDWIN,
H. L. JOHNSON.